United States Patent
Mirza et al.

(10) Patent No.: US 9,455,923 B2
(45) Date of Patent: Sep. 27, 2016

(54) NETWORK POLICY AND NETWORK DEVICE CONTROL

(71) Applicant: Verizon Patent and Licensing Inc., Arlington, VA (US)

(72) Inventors: Momin Mirza, Santa Clara, CA (US); Nisheeth Gupta, Palo Alto, CA (US)

(73) Assignee: Verizon Patent and Licensing Inc., Basking Ridge, CA (US)

( * ) Notice: Subject to any disclaimer, the term of this patent is extended or adjusted under 35 U.S.C. 154(b) by 162 days.

(21) Appl. No.: 14/298,677

(22) Filed: Jun. 6, 2014

(65) Prior Publication Data

US 2015/0358239 A1  Dec. 10, 2015

(51) Int. Cl.
*H04L 12/813* (2013.01)
*H04L 29/06* (2006.01)
*H04L 12/14* (2006.01)
*H04L 12/24* (2006.01)

(52) U.S. Cl.
CPC .......... *H04L 47/20* (2013.01); *H04L 12/1407* (2013.01); *H04L 41/0893* (2013.01); *H04L 63/10* (2013.01)

(58) Field of Classification Search
CPC ... H04L 47/20; H04L 12/14; H04L 12/1403; H04L 12/1407; H04W 4/26
See application file for complete search history.

(56) References Cited

U.S. PATENT DOCUMENTS

| | | | | |
|---|---|---|---|---|
| 6,085,238 A * | 7/2000 | Yuasa | ................. | H04L 12/4641 370/409 |
| 6,212,387 B1 * | 4/2001 | McLaughlin | .......... | H04B 7/022 455/137 |
| 8,965,434 B2 * | 2/2015 | Suh | ........ | H04L 5/0007 455/452.1 |
| 2003/0021283 A1 * | 1/2003 | See | ..................... | H04L 41/0213 370/401 |
| 2003/0033184 A1 * | 2/2003 | Benbassat | ............. | G06Q 10/06 705/7.14 |
| 2006/0248181 A1 * | 11/2006 | Glassco | ................ | H04L 67/322 709/223 |
| 2007/0109983 A1 * | 5/2007 | Shankar | .............. | H04L 41/0803 370/310.2 |
| 2008/0144525 A1 * | 6/2008 | Crockett | ............. | H04W 72/005 370/254 |
| 2009/0144282 A1 * | 6/2009 | Uramoto | ............. | G06F 21/6218 |
| 2010/0027485 A1 * | 2/2010 | Noh | .................. | H04W 74/0866 370/329 |
| 2010/0121964 A1 * | 5/2010 | Rowles | ................... | H04L 47/10 709/229 |
| 2010/0205129 A1 * | 8/2010 | Aaron | .................... | G06Q 30/02 706/14 |
| 2010/0284278 A1 * | 11/2010 | Alanara | .................. | H04L 47/11 370/235 |
| 2011/0275381 A1 * | 11/2011 | Moberg | ............ | H04W 72/0406 455/450 |
| 2011/0299390 A1 * | 12/2011 | Liu | ..................... | H04L 12/5695 370/230 |
| 2013/0055344 A1 * | 2/2013 | Rissanen | ............... | G06F 21/604 726/1 |
| 2014/0092771 A1 * | 4/2014 | Siomina | ................ | H04W 24/08 370/252 |
| 2014/0173076 A1 * | 6/2014 | Ravindran | .......... | H04L 41/5058 709/223 |
| 2014/0301329 A1 * | 10/2014 | Kim | ..................... | H04L 1/1861 370/329 |

* cited by examiner

*Primary Examiner* — Bunjob Jaroenchonwanit (57) ABSTRACT

A policy enforcer device may determine a value of multiple controls included on a control device. The multiple controls may be associated with zones of a facility. The policy enforcer device may determine, based on the values of the plurality of controls, relative amounts of bandwidth to allocate, of a total amount of available bandwidth, to the zones of the facility; and control one or more network devices to provide the determined amounts of bandwidth to the zones of the facility.

20 Claims, 8 Drawing Sheets

NETWORK POLICY AND NETWORK DEVICE CONTROL

BACKGROUND

In a network, policies may be implemented to manage how network traffic should be treated during transmission. For example, a network device or policy enforcer device may implement policies, such as traffic queuing algorithms, bandwidth filters, Quality of Service (QoS) policies, etc.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide a technique to adjust network policies (e.g., bandwidth availability) by zone in a facility. For example, network policies (e.g., relating to bandwidth availability associated with a particular zone of a facility) may be adjusted via a policy controller device (e.g., to limit bandwidth for one zone to make bandwidth available for another zone). In some implementations, network policies for particular user devices (e.g., regardless of zone) may also be adjusted via the policy controller device. In some implementations, operations of a network device (e.g., beamforming directions) may be controlled by the policy controller device.

Figure 1:
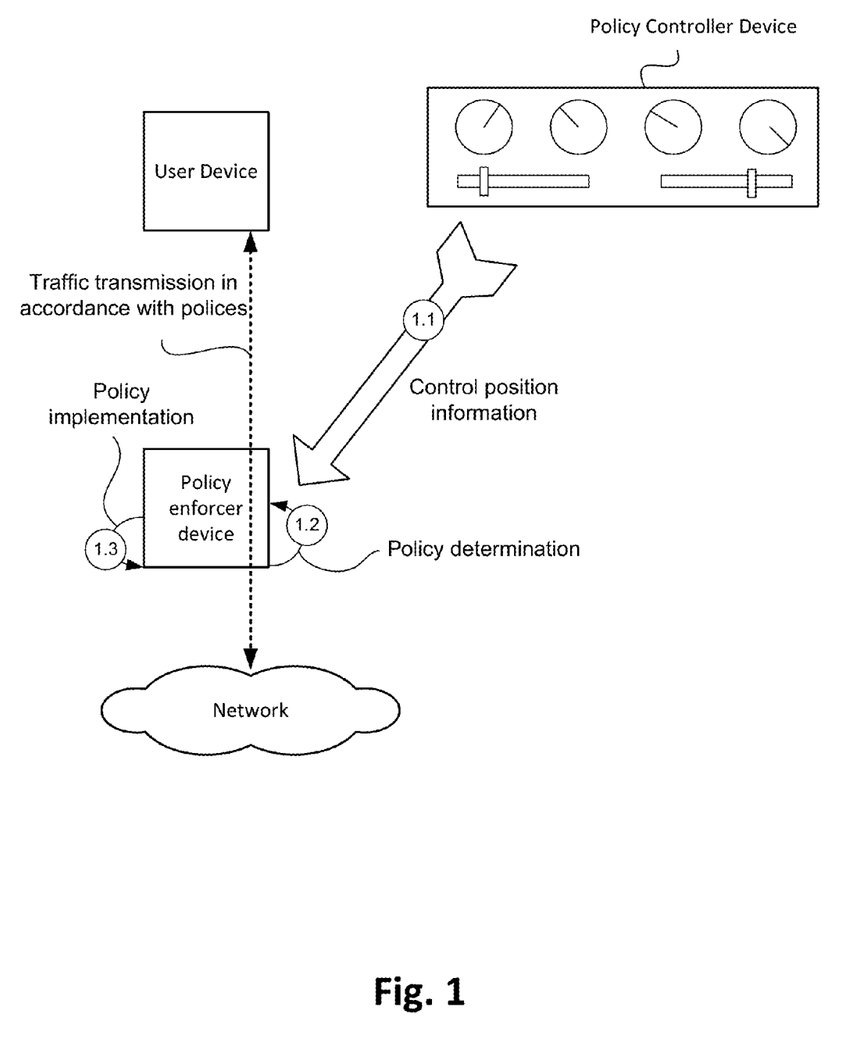
FIG. 1 illustrates an example overview of an implementation described herein.

FIG. 1 illustrates an example overview of an implementation described herein. As shown in FIG. 1, a policy controller device may include controls, such as dials, sliders, switches, etc. In some implementations, the policy controller device may be a physical device, or may be implemented virtually on a user device (e.g., the controls may be displayed on a user device). Each control may be associated with a particular zone (e.g., a room, a floor, a group of rooms, and/or some other predetermined area in a facility). Each control may be adjusted to modify a policy associated with the particular zone (e.g., a level of total bandwidth available to the particular zone). Additionally, or alternatively, a control may be associated with a particular group of user devices, and may be adjusted to modify policies associated with the particular group of user devices. Additionally, or alternatively, a control may be associated with operations of a network device, and may be adjusted to modify the operations of the network device (e.g., beamforming directions of wireless connection signals outputted by the network device).

As shown in FIG. 1, the policy controller device may output information identifying the position (i.e., the set value) of one or more controls associated with the policy controller device (arrow 1.1). A policy enforcer device may receive the control position information, and may correspondingly determine network polices (arrow 1.2). For example, the policy enforcer device may determine an amount of bandwidth to allocate to different zones based on the position of the controls.

The policy enforcer device may implement policies (arrow 1.3) when transmitting and/or receiving traffic to and/or from a user device associated with the particular zone (e.g., when traffic is transmitted via a particular port associated with the zone). As another example, if the policy enforcer device determines a policy associated with a particular user device (e.g., when a control that is associated with the particular user device is adjusted), the policy enforcer device may implement policies when transmitting and/or receiving traffic to and/or from the particular user device. As another example, if the control position is adjusted for a control used to modify a beamforming direction for wireless signals output by a network device, the policy enforcer device may direct the network device to modify the beamforming direction (e.g., to modify the available bandwidth at different locations in a building).

In some implementations, the policy controller device may be used to divert bandwidth from a zone having a surplus of bandwidth to a zone having a shortage of bandwidth. Additionally, or alternatively, the policy controller device may be used to prevent wireless network connectivity in certain zones of a facility (e.g., in connection with parental controls preventing wireless network connectivity in a child's room). Additionally, or alternatively, the policy controller device may be used to modify policies in different zones (e.g., in connection with parental controls preventing the access of particular websites in a child's room). Additionally, or alternatively, the policy controller device may be used for some other purpose in connection with modifying policies by zone and/or by user device.

Figure 2:
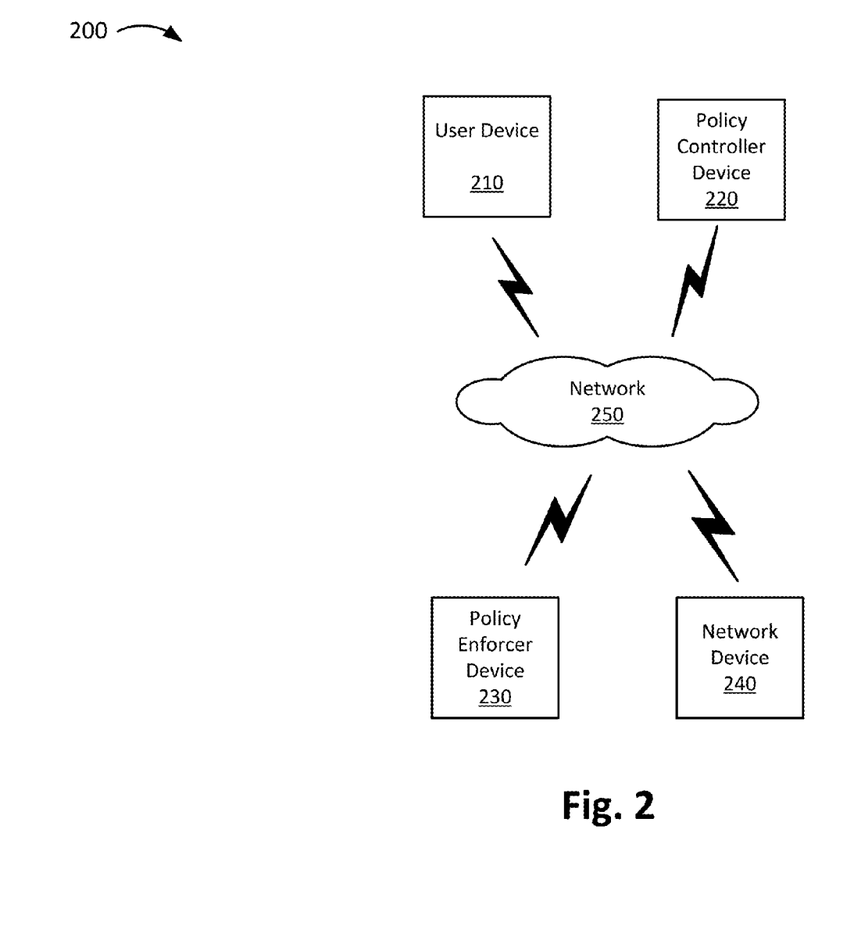
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210, policy controller device 220, policy enforcer device 230, network device 240, and network 250.

User device 210 may include a device capable of communicating via a network, such as network 250. For example, user device 210 may correspond to a mobile communication device (e.g., a smart phone or a personal digital assistant (PDA)), a portable computer device (e.g., a laptop or a tablet computer), a desktop computer device, a gaming device, a set-top box, or another type of device.

In some implementations, user device 210 may provide control configuration information to policy controller device 220. The control configuration information may identify policies controlled by particular controls associated with policy controller device 220. For example, the control configuration information may identify that a particular dial controls bandwidth availability for a particular zone or particular group of user devices 210. Additionally, or alternatively, the control configuration information may identify that a particular dial controls beamforming directions of wireless signals output by network device 240.

Policy controller device 220 may include one or more computing devices. Policy controller device 220 may include controls, such as dials, sliders, switches, etc. that may be adjusted to modify policies and/or operations of network device 240 or another device. In some implementations, policy controller device 220 may output control position information indicating the position of controls implemented by policy controller device 220.

Policy enforcer device 230 may include one or more computing devices, such as a server device or a collection of server devices. Policy enforcer device 230 may receive control position information from policy controller device 220 (e.g., information identifying position values corresponding to the position of controls on policy controller device 220), determine policies based on the position values, and implement the policies. For example, policy enforcer device 230 may implement policies (e.g., to transmit traffic at particular bitrates, Quality of Service (QoS) policies, etc.) when traffic is transmitted (e.g., by network device 240) to and/or from particular user devices 210. Additionally, or alternatively, policy enforcer device 230 may implement policies when traffic is transmitted via a particular port (e.g., a particular port associated with a particular zone). For example, policy enforcer device 230 may implement policies to reduce the amount of bandwidth available to one zone in order to make additional bandwidth available for another zone. Additionally, or alternatively, policy enforcer device 230 may adjust a beamforming direction in order to limit bandwidth to a particular zone.

Network device 240 may include a router, a hub, a switch, an access point, and/or some other type of network device. Network device 240 may transmit traffic to and/or from user device 210 and/or network 250. Network device 240 may communicate wirelessly with user device 210 via wireless connection signals outputted by network device 240. Additionally, or alternatively, network device 240 may communicate with user device 210 via a wired connection via one or more ports. In some implementations, a port may be associated with a particular zone. In some implementations, network device 240 may be integrated with policy enforcer device 230. Alternatively, policy enforcer device 230 and network device 240 may be implemented separately.

Network 250 may include one or more wired and/or wireless networks. For example, network 250 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
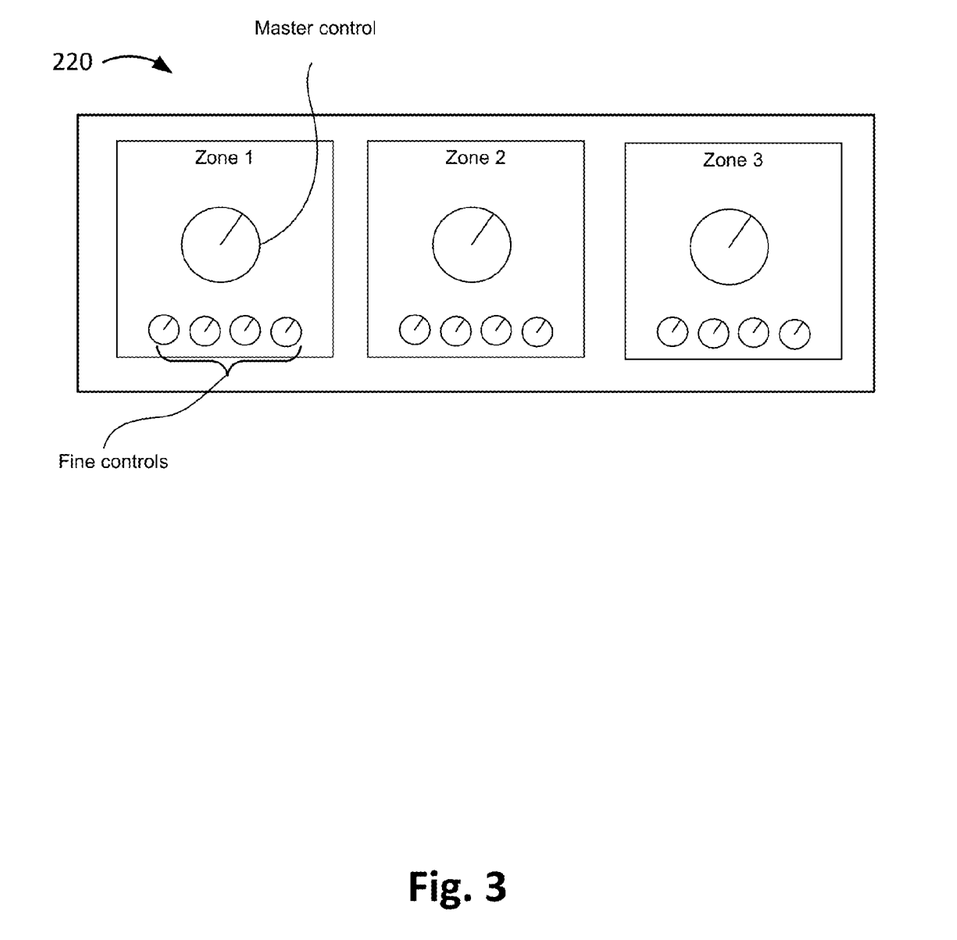
FIG. 3 illustrates example components of a policy controller device.

FIG. 3 illustrates example components of a policy controller device. As shown in FIG. 3, policy controller device 220 may include a set of dials, for each of a number of zones, to modify policies associated with traffic transmitted via the zones (e.g., traffic transmitted via a particular port associated with the zone). A particular set of dials may include a master control dial to control a total level of bandwidth available to a particular zone. The particular set of dials may also include "fine controls" to adjust policies with which traffic is transmitted, such as QoS policies based on traffic type (e.g., video type traffic, voice type traffic, etc.), application associated with the traffic, and/or web sites or domains associated with the traffic. For example, one type of traffic (e.g., video traffic) associated with one type of application (e.g., a video streaming application) may have different policy than another type of traffic (e.g., audio-only traffic) associated with another type of application (e.g., an audio streaming application). Policy controller device 220 may output control values that correspond to the position of the controls.

While a particular example of policy controller device 220 is shown in FIG. 3, other examples are possible. For example, policy controller device 220 may have any quantity of dials in a variety of arrangements. Also, policy controller device 220 may include some other type of control, such as sliders, switches, etc. In some implementations, policy controller device 220 may be implemented as a physical device or may be implemented as a device that electronically displays the controls. Further, policy controller device 220 may include controls for a group of user devices in addition to, or instead of controls for zones. Also, policy controller device 220 may include controls to adjust beamforming directions of wireless signals output by network device 240. The functions of each control (e.g., the policies modified by each control) may be different than what is described above and may be based on control configuration information.

Figure 4:
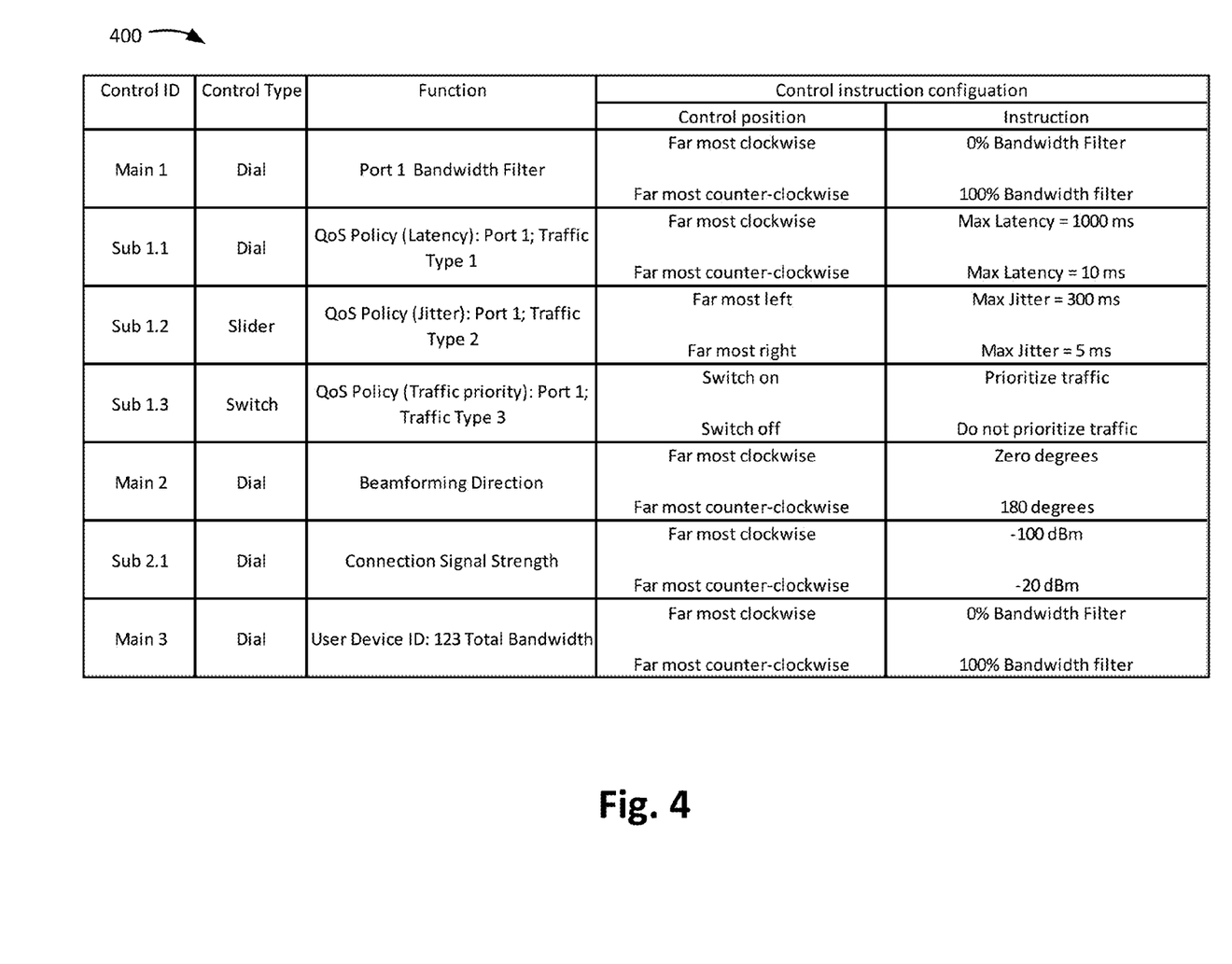
FIG. 4 illustrates an example data structure that may store control configuration information.

FIG. 4 illustrates an example data structure 400 that may store control configuration information. In some implementations, data structure 400 may be stored in a memory of policy controller device 220 and/or policy enforcer device 230. In some implementations, data structure 400 may be stored in a memory separate from, but accessible by, policy controller device 220 and/or policy enforcer device 230 (e.g., a "cloud" storage device). In some implementations, data structure 400 may be stored by some other device in environment 200, such as user device 210. A particular instance of data structure 400 may contain different information and/or fields than another instance of data structure 400.

As shown in FIG. 4, each entry in data structure 400 may identify an identifier (ID) of a particular control on policy controller device 220, a type of the particular control (e.g., a dial, a slider, a switch, etc.), and the function of the particular control (e.g., a bandwidth filter for traffic transmitted via a particular port on network device 240, a QoS policy for traffic of a particular type, a beamforming direction, a wireless connection signal strength, etc.). Data structure 400 may also store information identifying control instruction configuration information for the particular control. The control instruction configuration information may identify a control position (e.g., corresponding to a control position value) and a control instruction corresponding to the control position (e.g., an instruction to implement a bandwidth filter, a QoS policy, a beamforming direction, etc.).

In the example shown in FIG. 4, data structure 400 may store information identifying an ID of a particular control (e.g., "Main 1"), the type of the particular control (e.g., a dial), and the function of the control (e.g., a bandwidth filter for traffic transmitted via a particular port). Data structure 400 may also store information identifying a control instruction based on the position of the control (e.g., the position of the dial). For example, data structure 400 may store information identifying that when the dial is positioned in the far most clockwise position, a bandwidth filter of 0% should be applied to traffic associated with port 1 (e.g., to prevent bandwidth from being used to transmit traffic via port 1). When the dial is positioned in the far most counter-clockwise position, a bandwidth filter of 100% should be applied to traffic associated with port 1 (e.g., to permit all available bandwidth for the transmission of traffic). When the dial is positioned in between the far most counter-clockwise position and the far most clockwise position, a corresponding bandwidth filter should be applied based on the position of the dial (e.g., a 50% filter when the dial is halfway between the far most counter-clockwise position and the far most clockwise position). In the above example, the "Main 1" dial may be used to adjust the amount of bandwidth available to a zone associated with port 1.

As another example, data structure 400 may store information identifying that the control having the ID "Sub 1.1" controls a QoS policy (e.g., a policy relating to transmission latency), for traffic of a particular type and transmitted via port 1 (e.g., a latency from 10 milliseconds (ms) to 1000 ms). In the above example, the "Sub 1.1" dial may be used to adjust the maximum latency for traffic transmitted via port 1. For example, the maximum latency may be adjusted to balance performance with bandwidth availability.

As another example, data structure 400 may store information identifying that the control having the ID "Main 2" controls a beamforming direction of wireless connection signals associated with network device 240. For example, the "Main 2" dial may be used to adjust the beamforming direction from 0 degrees to 180 degrees based on the position of the dial. As another example, the "Sub 2.1" dial may be used to adjust the wireless connection signal strength of wireless connection signals outputted by network device 240. As another example, the "Main 3" dial may be used to adjust the total amount of bandwidth available to a particular user device 210 (e.g., the user device 210 having the ID 123).

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible.

Figure 5:
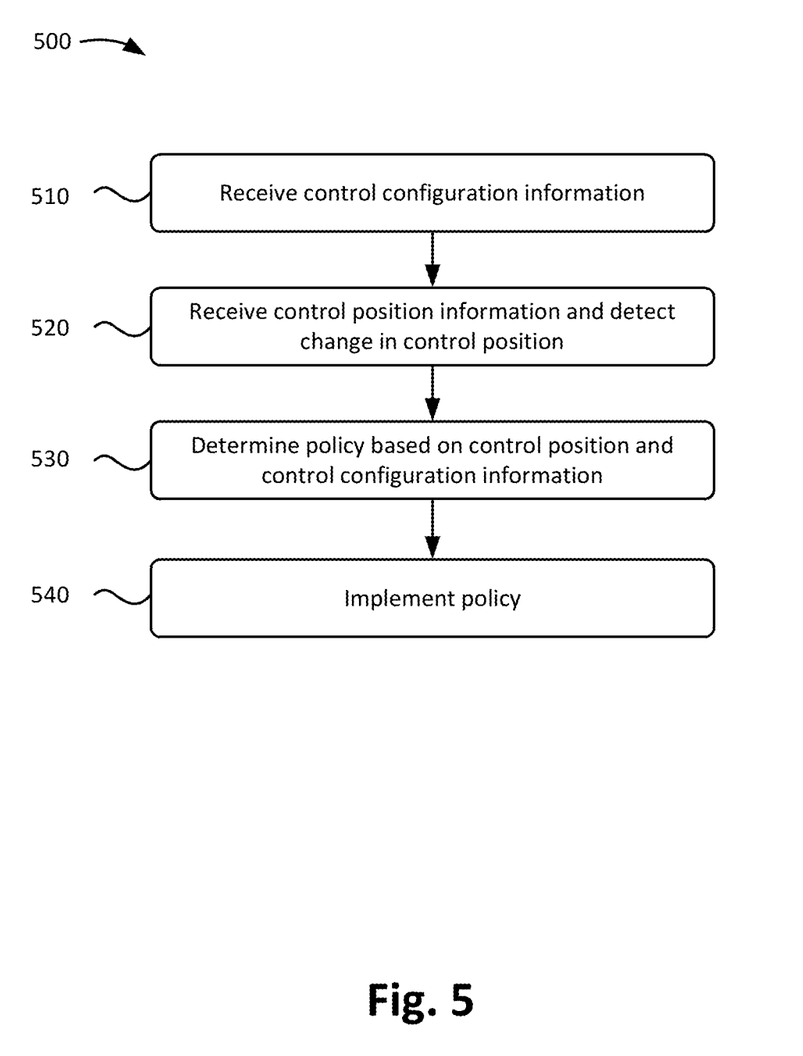
FIG. 5 illustrates a flowchart of an example process for generating and outputting a control instruction.

FIG. 5 illustrates a flowchart of an example process 500 for generating and outputting a control instruction. In some implementations, process 500 may be performed by policy enforcer device 230. In some implementations, some or all of blocks of process 500 may be performed by one or more other devices.

As shown in FIG. 5, process 500 may include receiving control configuration information (block 510). For example, policy enforcer device 230 may receive control configuration information from user device 210. As described above with respect to FIG. 4, the control configuration information may identify policies controlled by particular controls associated with policy controller device 220. For example, the control configuration information may identify that a particular dial controls bandwidth availability for a particular zone or particular group of user devices 210. Also, the control configuration information may identify control instructions based on the positions of various controls on policy controller device 220.

Process 500 may also include receiving control position information and detecting a change in the control position (block 520). For example, policy enforcer device 230 may receive control position information (e.g., control position values) from policy controller device 220. Further, policy enforcer device 230 may detect a change in the position of a control based on the control position information. As an example, policy enforcer device 230 may detect that the position of the control has changed when a user of policy controller device 220 physically alters the position of the control (e.g., when policy controller device 220 is implemented as a physical device). In some implementations, policy enforcer device 230 may detect the change in the control position based on a change in voltage when the position of the control is physically changed (e.g., when a switch is flipped, when a dial is turned, when a slider is adjusted, etc.). Alternatively (e.g., when policy controller device 220 is implemented as a device that electronically displays the controls), policy controller device 220 may receive a selection via the display to change the position of the control, and may output information regarding the change in the control position to policy enforcer device 230.

Process 500 may further include determining a policy based on the control position and control configuration information (block 530). For example, policy enforcer device 230 may determine the policy by mapping the position of the control with the control configuration information. As an example, assume that policy enforcer device 230 detects that the position of a particular control (e.g., a dial) has been rotated from the far-most counter-clockwise position to the far-most clockwise position. Further, assume that the control configuration information identifies that the particular control is used to adjust bandwidth filters for traffic associated with a particular zone (e.g., a particular port on network device 240). Further, assume that the control configuration information identifies that the bandwidth filter should permit 100% of available bandwidth when the control is positioned in the far-most clockwise position, and that the bandwidth filter should permit 0% of the available bandwidth when the control is positioned in the far-most counter-clockwise position. Given these assumptions, policy enforcer device 230 may determine a policy to modify the bandwidth filter to permit 100% of the available bandwidth.

Process 500 may also include implementing the policy (block 540). For example, policy enforcer device 230 may implement the policy associated (e.g., a policy relating to the bandwidth filter as described in the above example). For example, policy enforcer device 230 may permit 100% of available bandwidth to be provided for traffic associated with the particular zone. As another example, if the control instruction identified a beamforming direction, policy enforcer device 230 may output the control instruction to a corresponding network device 240 to cause network device 240 to output wireless connection signals in the identified beamforming direction. Alternatively, (e.g., if policy enforcer device 230 functions as network device 240), policy enforcer device 230 may output wireless signals in the identified beamforming direction.

Figure 6:
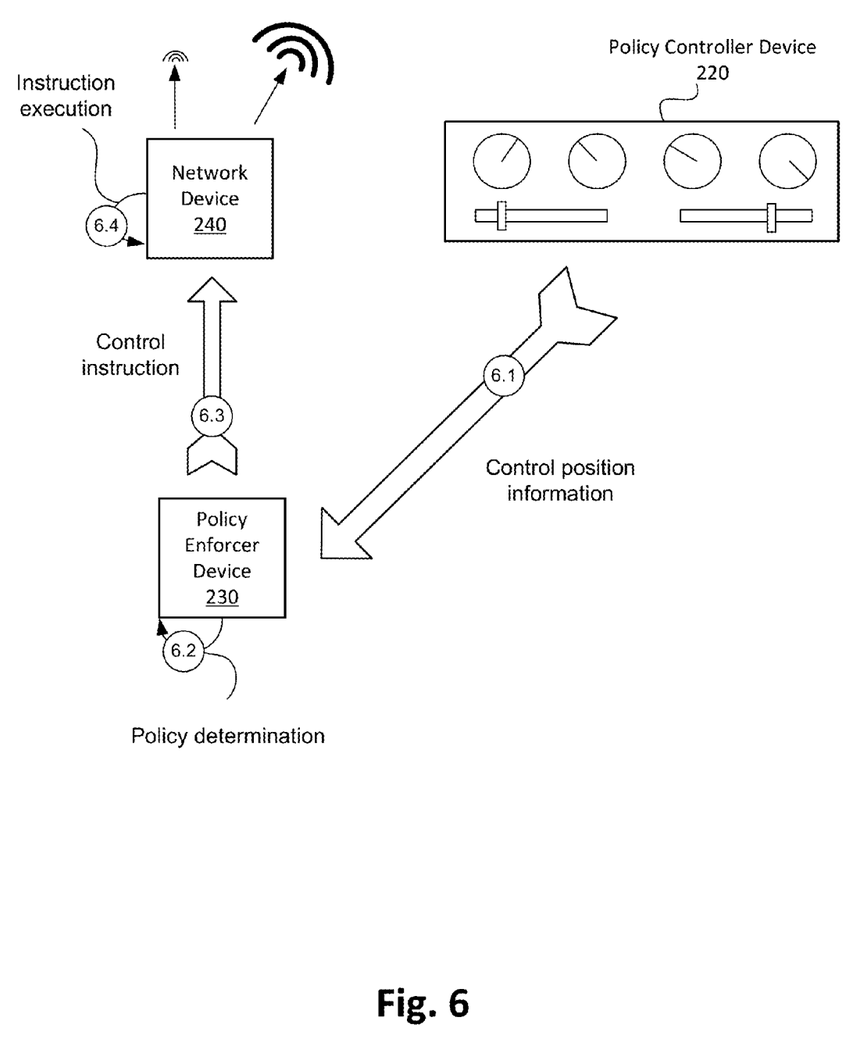
FIG. 6 illustrates an example implementation for modifying a beamforming direction of wireless connection signals output by a network device.

FIG. 6 illustrates an example implementation for modifying a beamforming direction of wireless connection signals output by a network device. As shown in FIG. 6, policy controller device 220 may output control position information (arrow 6.1) based on the position of controls of policy controller device 220. Policy enforcer device 230 may determine a policy (arrow 6.2) based on the position of the controls and configuration information mapping the positions of the controls with corresponding policies. In FIG. 6, assume that the position of the controls correspond to beamforming directions and signal strengths of wireless connection signals that policy enforcer device 230 should output. Given this assumption, policy enforcer device 230 may determine a policy that identifies the beamforming directions and signal strengths.

Policy enforcer device 230 may output a control instruction (arrow 6.3), corresponding to the policy, to cause network device to modify the beamforming direction and the signal strength. Network device 240 may execute the control instruction (arrow 6.4). For example, network device 240 may execute the control instruction by outputting the wireless connection signals in the beamforming directions and at the signal strengths in accordance with the control instruction. In the example shown in FIG. 6, network device 240 may output wireless connection signals in two different directions and at two different strengths. In some implementations, a user of policy controller device 220 may select the beamforming directions and the signal strengths to reduce the amount of bandwidth available in one zone of a facility in order to make additional bandwidth available to another zone of the facility.

Figure 7:
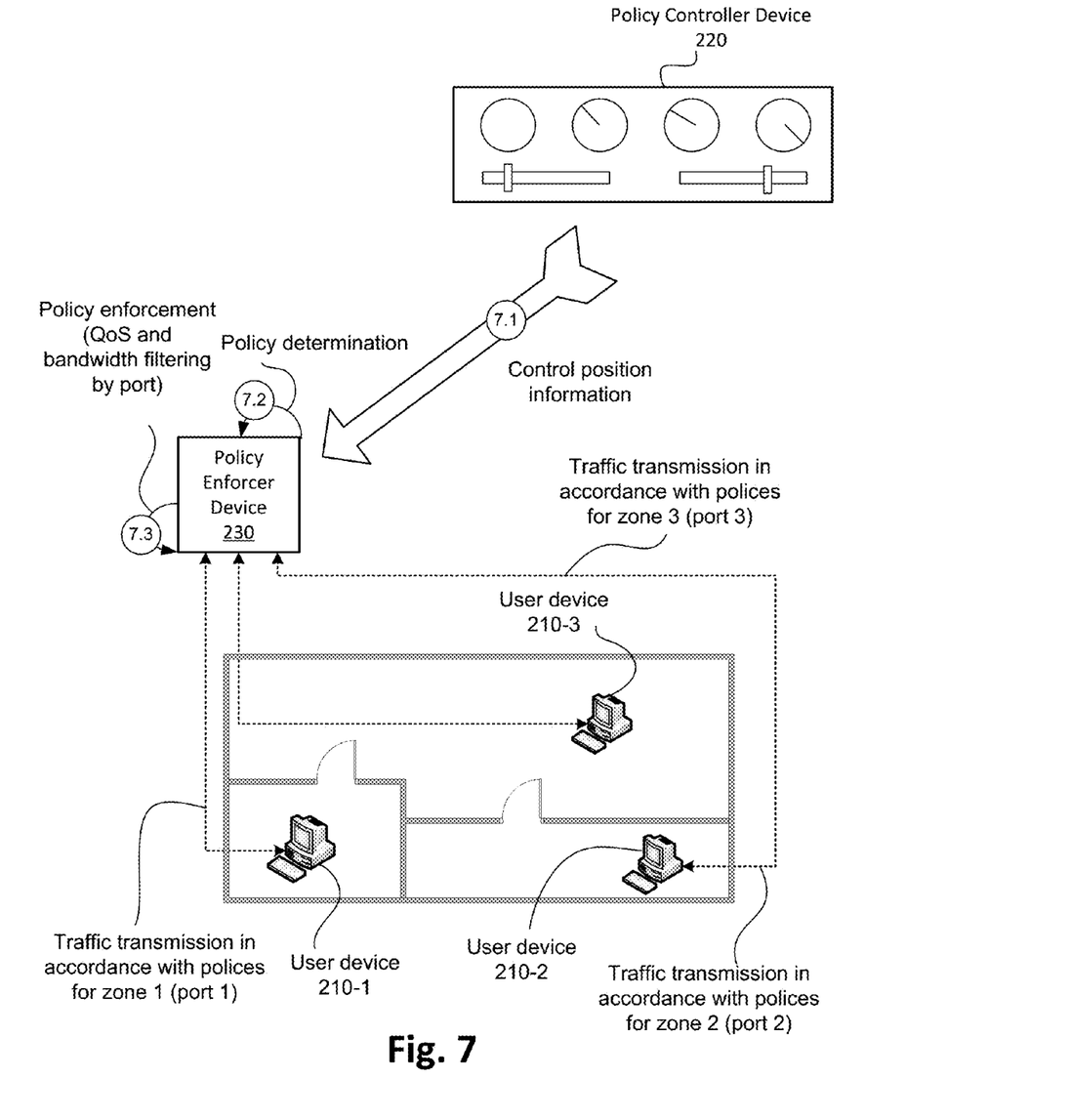
FIG. 7 illustrates an example implementation for modifying QoS policies for traffic associated with different zones.

FIG. 7 illustrates an example implementation for modifying QoS policies for traffic associated with different zones. As shown in FIG. 7, policy controller device 220 may output information identifying the position of controls included on policy control device 220 (arrow 7.1). Policy enforcer device 230 may generate policies (arrow 7.2) based on the position of controls of policy controller device 220 and configuration instructions mapping the positions of the controls with corresponding policies. In FIG. 7, assume that the position of the controls correspond to QoS policies and bandwidth filters for different zones. Given this assumption, policy enforcer device 230 may generate policies that identify QoS policies for traffic associated with the different zones, and may implement the policies (arrow 7.3). Policy enforcer device 230 may enforce the QoS policies and bandwidth filters based on the ports via which the traffic is transmitted. For example, assume that a first user device 210 (e.g., user device 210-1) is connected to a first port, a second user device 210 (e.g., user device 210-2) is connected to a second port, and a third user device 210 (e.g., user device 210-3) is connected to a third port. Given these assumptions, policy enforcer device 230 may implement a first set of QoS policies and bandwidth filters for traffic transmitted to and/or from user device 210-1 via the first port, a second set of QoS policies and bandwidth filters for traffic transmitted to and/or from user device 210-2 via the second port, and third set of QoS policies and bandwidth filters for traffic transmitted to and/or from user device 210-3 via the third port.

The different QoS policies may identify how different types of traffic, transmitted via the different ports, is to be treated. For example, the QoS policies may indicate that traffic of a particular type (e.g., video streaming traffic) is to be transmitted at a particular bitrate, whereas traffic of another type (e.g., audio traffic) is to be transmitted at a different bitrate. Additionally, or alternatively, the QoS policies may block certain types of traffic, while permitting other types of traffic (e.g., blocking traffic to certain applications or web sites in accordance with parental controls).

While particular examples are shown in FIGS. 6-7, the above descriptions are merely example implementations. In practice, other examples are possible from what is described above in FIGS. 6-7. For example, policy controller device 220 may generate and implement some other policy or control instruction based on the position of the controls and different control configurations. In some implementations, policy controller device 220 may remotely receive changes to controls, and may generate a control instruction and/or policy based on remotely receiving the change to the control. In some implementations, a user of policy controller device 220 may receive network usage information, and may select to modify policies via policy controller device 220 based on the network usage information. For example, the user of policy controller device 220 may receive information identifying a shortage of bandwidth in a first zone, and a surplus of bandwidth in second zone. The user, via policy controller device 220, may select to modify policies and/or control instructions such that bandwidth is reduced from the second zone and made available to the first zone.

Figure 8:
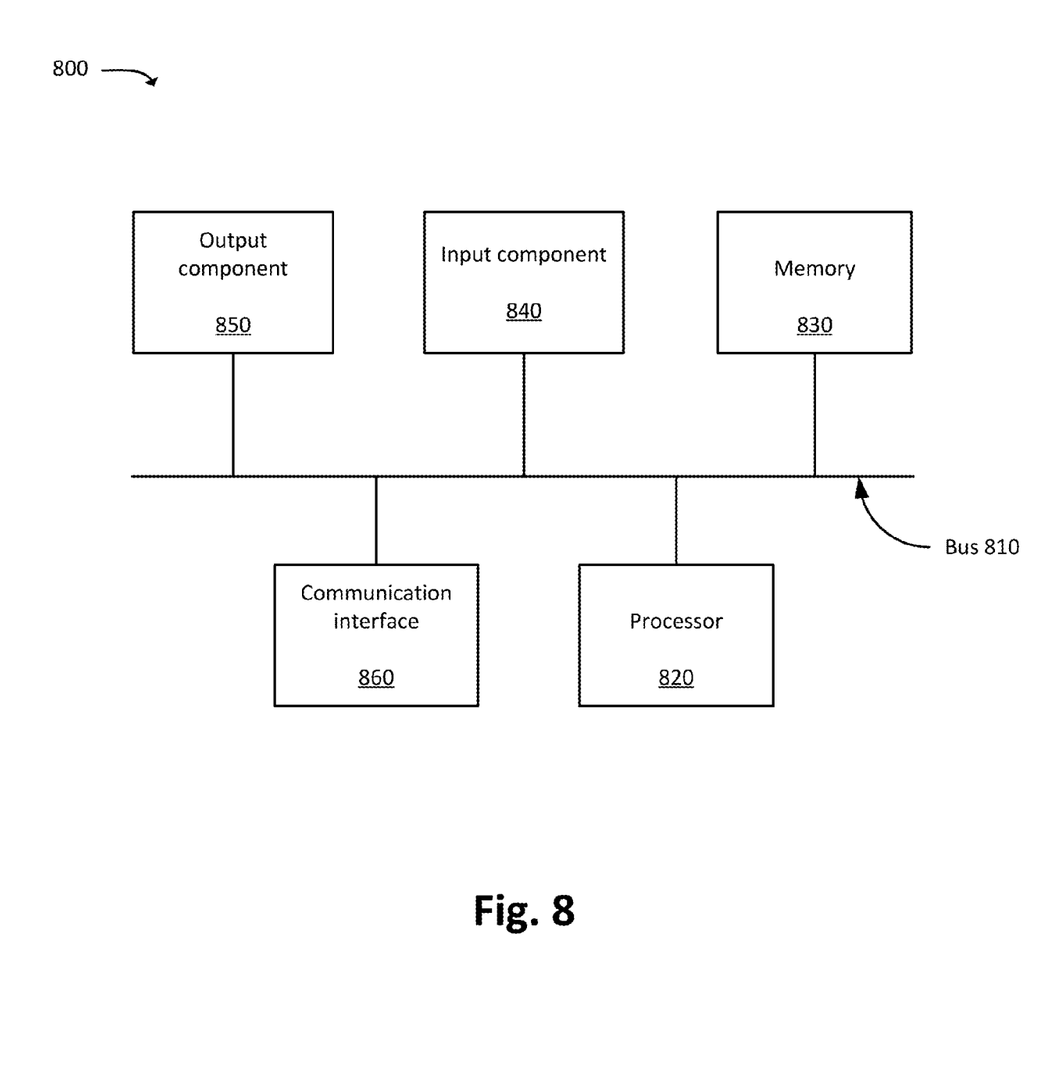
FIG. 8 illustrates example components of one or more devices, according to one or more implementations described herein.

FIG. 8 is a diagram of example components of device 800. One or more of the devices described above (e.g., with respect to FIGS. 1-3, 6, and 7) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIG. 5, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1-3, 6, and 7), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A system comprising
a controller device comprising a plurality of physical controls, each of the physical controls generating a value; and
a policy enforcer device to:
receive a value of a particular control, of the plurality of physical controls, the plurality of controls being associated with different zones of a facility, and each of the different zones corresponding to an area of the facility;
receive a data structure that includes control configuration information that identifies functions of the plurality of the physical controls; and
control the providing of a particular amount of bandwidth to a particular zone of the plurality of zones, associated with a particular physical control of the plurality of controls, based on the position of the particular control and based on the configuration information.

2. The system of claim 1, wherein the
plurality of controls include at least one of:
a physical dial,
a physical switch, or
a physical slider.

3. The system of claim 1, wherein the particular control controls a network traffic transmission policy for network traffic transmitted via a particular port,
the particular port being associated with the particular zone of the particular control.

4. The system of claim 1, wherein the data structure defines, for each of the plurality of controls, how physical positions of each of the plurality of controls are to be interpreted.

5. A method comprising:
receiving, by a policy enforcer device and from a control device, values of a plurality of physical controls included on the control device, the plurality of physical controls being associated with different zones of a facility, and each of the different zones corresponding to an area of the facility;
determining, by the policy enforcer device and based on the values of the plurality of controls, relative amounts of bandwidth to allocate, of a total amount of available bandwidth, to the zones of the facility; and
controlling, by the policy enforcer device, one or more network devices to provide the determined amounts of bandwidth to the zones of the facility.

6. The method of claim 5, wherein the physical controls include at least one of:
a physical dial,
a physical switch, or
a physical slider.

7. The method of claim 5, wherein controlling the one or more network devices includes:

controlling a wireless router to output wireless connection signals in a particular direction in order to provide the determined amounts of bandwidth to the zones of the facility.

8. The method of claim 5, wherein controlling the one or more network devices includes:
controlling a wireless router to output wireless connection signals at a particular strength in order to provide the determined amounts of bandwidth to the zones of the facility.

9. The method of claim 5, wherein controlling the one or more network devices includes:
controlling the one or more network devices to implement a Quality of Service (QoS) policy or a bandwidth filter in order to provide the determined amounts of bandwidth to the zones of the facility.

10. The method of claim 5, wherein each of the plurality of controls are associated with a network transmission policy for a corresponding zone in a facility.

11. The method of claim 5, wherein controlling the one or more network devices includes:
controlling the one or more network devices to apply a policy to traffic transmitted via a port associated with the particular zone in order to provide the determined amounts of bandwidth to the zones of the facility.

12. The method of claim 5, wherein the method further includes:
receiving, by the policy enforcer device, a data structure that includes control configuration information that identifies functions of the plurality of the physical controls, wherein the determination of the relative amounts of bandwidth to allocate is additionally based on the control configuration information.

13. A system comprising:
a policy enforcer device, comprising:
a non-transitory memory device storing:
a plurality of processor-executable instructions; and
a processor configured to execute the processor-executable instructions, wherein executing the processor-executable instructions causes the processor to:
receive a value of a plurality of physical controls included on a control device, the plurality of physical controls being associated with different zones of a facility, and each of the different zones corresponding to an area of the facility;
determine, based on the values of the plurality of controls, relative amounts of bandwidth to allocate, of a total amount of available bandwidth, to the zones of the facility; and
control one or more network devices to provide the determined amounts of bandwidth to the zones of the facility.

14. The system of claim 13, wherein the physical controls include at least one of:
a physical dial,
a physical switch, or
a physical slider.

15. The system of claim 13, wherein executing the processor-executable instructions, to control the one or more network devices, includes controlling a wireless router to output wireless connection signals in a particular direction in order to provide the determined amounts of bandwidth to the zones of the facility.

16. The system of claim 13, wherein executing the processor-executable instructions, to control the one or more network devices, causes the processor to control a wireless router to output wireless connection signals at a particular strength in order to provide the determined amounts of bandwidth to the zones of the facility.

17. The system of claim 13, wherein executing the processor-executable instructions, to control the one or more network devices, causes the processor to control the one or more network devices to implement a Quality of Service (QoS) policy or a bandwidth filter in order to provide the determined amounts of bandwidth to the zones of the facility.

18. The system of claim 13, wherein each of the plurality of controls are associated with a network transmission policy for a corresponding zone in a facility.

19. The system of claim 13, wherein executing the processor-executable instructions, to control the one or more network devices, causes the processor to control the one or more network devices to apply a policy to traffic transmitted via a port associated with the particular zone in order to provide the determined amounts of bandwidth to the zones of the facility.

20. The system of claim 13, wherein executing the processor-executable instructions further cause the processor to:
receive a data structure that includes control configuration information that identifies functions of the plurality of the physical controls, wherein the determination of the relative amounts of bandwidth to allocate is additionally based on the control configuration information.

* * * * *